(12) United States Patent
Kurashima et al.

(10) Patent No.: US 8,704,757 B2
(45) Date of Patent: Apr. 22, 2014

(54) INPUT SYSTEM AND INPUT APPARATUS

(75) Inventors: Shigemi Kurashima, Shinagawa (JP); Satoshi Sakurai, Shinagawa (JP); Takashi Yuba, Shinagawa (JP); Takuya Uchiyama, Shinagawa (JP); Masahiro Yanagi, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 946 days.

(21) Appl. No.: 12/155,661

(22) Filed: Jun. 6, 2008

(65) Prior Publication Data

US 2008/0303788 A1    Dec. 11, 2008

(30) Foreign Application Priority Data

Jun. 7, 2007  (JP) ................. 2007-152008

(51) Int. Cl.
*G09G 5/00* (2006.01)
(52) U.S. Cl.
USPC .......................................... 345/156; 345/157
(58) Field of Classification Search
USPC .......................................... 345/156–160, 169
See application file for complete search history.

(56) References Cited

U.S. PATENT DOCUMENTS

| | | | | |
|---|---|---|---|---|
| 5,372,365 A * | 12/1994 | McTeigue et al. | ............. | 473/409 |
| 5,448,999 A * | 9/1995 | Teare et al. | ................... | 600/546 |
| 6,049,327 A * | 4/2000 | Walker et al. | ................. | 345/158 |
| 6,128,004 A * | 10/2000 | McDowall et al. | ............. | 345/158 |
| 6,244,873 B1 * | 6/2001 | Hill et al. | ...................... | 434/236 |
| 6,380,923 B1 * | 4/2002 | Fukumoto et al. | ............ | 345/156 |
| 6,515,669 B1 * | 2/2003 | Mohri | ............................ | 345/474 |
| 6,660,042 B1 * | 12/2003 | Curcie et al. | .................... | 623/24 |
| 6,720,984 B1 * | 4/2004 | Jorgensen et al. | ............ | 715/863 |
| 6,744,420 B2 * | 6/2004 | Mohri | ............................ | 345/157 |
| 6,941,239 B2 * | 9/2005 | Unuma et al. | ................ | 702/141 |
| 7,092,785 B2 * | 8/2006 | Alsio et al. | ..................... | 700/168 |
| 7,161,579 B2 * | 1/2007 | Daniel | ........................... | 345/156 |
| 7,333,090 B2 * | 2/2008 | Tanaka et al. | ................. | 345/158 |
| 7,405,725 B2 * | 7/2008 | Mohri et al. | .................. | 345/156 |
| 7,493,157 B2 * | 2/2009 | Gozani et al. | ................. | 600/546 |
| 7,693,572 B2 * | 4/2010 | Kuramori et al. | ............ | 600/546 |
| 2002/0191842 A1 * | 12/2002 | Kajitani et al. | ............... | 382/159 |
| 2003/0137489 A1 * | 7/2003 | Bajramovic | .................. | 345/158 |

(Continued)

FOREIGN PATENT DOCUMENTS

JP      5-111881         5/1993
JP      05111881 A  *   5/1993

(Continued)

*Primary Examiner* — Jason Mandeville
(74) *Attorney, Agent, or Firm* — Staas & Halsey LLP

(57) ABSTRACT

An input system executes an input to an information processing apparatus depending on the hand motion. Plural myoelectric sensors are provided on an area between a wrist of the person and bases of a second finger to a fifth finger, and detect myoelectric signals depending on the hand motion. A setting portion outputs at least one command to make the person execute at least one particular motion in a state where the myoelectric sensors are worn on the hand, and associates the detected myoelectric signals after the output of the command with the particular motion corresponding to the command. An input portion identifies the hand motion from myoelectric signals detected based on the hand motion after the termination of the association and the association result of the setting portion, and executes the input to the information processing apparatus depending on the identified hand motion.

11 Claims, 11 Drawing Sheets

(56) References Cited

U.S. PATENT DOCUMENTS

| | | | |
|---|---|---|---|
| 2004/0068409 A1* | 4/2004 | Tanaka et al. | 704/272 |
| 2005/0009584 A1* | 1/2005 | Park et al. | 455/575.6 |
| 2005/0179644 A1* | 8/2005 | Alsio et al. | 345/156 |
| 2005/0257174 A1* | 11/2005 | Wilson | 715/863 |
| 2006/0038917 A1* | 2/2006 | Funato et al. | 348/376 |
| 2006/0248478 A1* | 11/2006 | Liau | 715/863 |
| 2009/0005699 A1* | 1/2009 | Sakurai et al. | 600/546 |

FOREIGN PATENT DOCUMENTS

| | | |
|---|---|---|
| JP | 7121294 | 5/1995 |
| JP | 7248873 | 9/1995 |
| JP | 11338597 | 12/1999 |
| JP | 2001231798 A * | 8/2001 |

* cited by examiner

FIG. 8A

| POINTER MOVING PATTERN $P_c$ | POINTER MOTION MESSAGE |
|---|---|
| $P_0$ | MOVE SECOND FINGER (INDEX FINGER) RIGHTWARD AND LEFTWARD |
| $P_1$ | MOVE SECOND FINGER (INDEX FINGER) UPWARD AND DOWNWARD |
| $P_2$ | STOP |
| $P_3$ | CLICK LEFT BUTTON WITH SECOND FINGER (INDEX FINGER) |
| ⋮ | ⋮ |
| $P_m$ | DOUBLE-CLICK LEFT BUTTON WITH SECOND FINGER (INDEX FINGER) |

FIG. 8B

| POINTER MOVING PATTERN $P_c$ | CHARACTERISTIC MASTER DATA $F(c)$ |
|---|---|
| $P_0$ | $F(0)$ |
| $P_1$ | $F(1)$ |
| $P_2$ | $F(2)$ |
| $P_3$ | $F(3)$ |
| ⋮ | ⋮ |
| $P_m$ | $F(m)$ |

INPUT SYSTEM AND INPUT APPARATUS

BACKGROUND OF THE INVENTION

1. Field of the Invention

The present invention relates to an input system and an input apparatus, and more particularly to an input system and an input apparatus inputting data to an information processing apparatus depending on the hand motion of a person.

2. Description of the Related Art

Conventionally, there have been known various types of pointing devices such as a mouse, and a track ball, which are used for a pointing operation (an instruction operation) to move a pointer on a screen at a desired position.

Recently, there have been studied a controlling device which detects the motion and the power in each part of a body by using a myoelectric signal detected from a skin-surface electrode, and controls an control object depending on the results of the detection (see e.g. Japanese Laid-Open Patent Publication No. 07-248873), and an input system which decides input information of a keyboard and the like based on the results of the detection of a detecting device such as a myoelectric sensor worn on a finger and the like (see e.g. Japanese Laid-Open Patent Publication No. 07-121294, and Japanese Laid-Open Patent Publication No. 11-338597).

However, in the invention disclosed by Japanese Laid-Open Patent Publication Nos. 07-248873, 07-121294, and 11-338597, a myoelectric signal detecting device or a finger type sensor module has to be worn at the same position every time. This is because, when the myoelectric signal detecting device or the finger type sensor module is worn at a shifting position, a different myoelectric signal is obtained even if the hand is similarly moved, and there is a possibility that the myoelectric signal cannot be detected with high accuracy.

Moreover, in Japanese Laid-Open Patent Publication No. 07-121294, a process deciding relationship between the output of the sensor and the finger is disclosed, but the process is done on the assumption that the sensor module is worn at a preset position on the hand or the arm. Therefore, the above-mentioned problem is not solved.

To detect a finger motion, it is desirable to wear the sensor module on the finger or a part near the finger. However, when the sensor module is worn on the finger, there is a fear that the finger motion is limited. When the sensor module is made to fit the finger for prevention of falling off, it is difficult to remove the sensor module after use, and when the sensor module is adversely made to remove easily, the sensor module is easy to fall off the finger during use.

SUMMARY OF THE INVENTION

It is an object of the present invention to provide an input system and an input apparatus capable of executing an input to an information processing apparatus with high accuracy, without executing such a complicated operation as to set a plurality of myoelectric sensors on preset positions accurately.

According to a first aspect of the present invention, there is provided an input system executing an input to an information processing apparatus depending on the hand motion of a person, including: a plurality of myoelectric sensors that are provided on an area between a wrist of the person and bases of a second finger to a fifth finger, and detect myoelectric signals depending on the hand motion; a setting portion that outputs at least one command to make the person execute at least one particular motion using the hand in a state where the plurality of myoelectric sensors are worn on the hand, and associates the myoelectric signals detected by the plurality of myoelectric sensors after the output of the command with the particular motion corresponding to the command; and an input portion that identifies the hand motion from myoelectric signals detected by the plurality of myoelectric sensors based on the hand motion of the person after the termination of the association by the setting portion, and the association result of the setting portion, and executes the input to the information processing apparatus depending on the identified hand motion.

With the above arrangement, even if the plurality of myoelectric sensors are provided at positions that shift from the positions which are the standard of the measurement, the setting portion outputs at least one command to make the person execute at least one particular motion using the hand, and associates the myoelectric signals detected by the plurality of myoelectric sensors when the person executes the particular motion based on the command with the particular motion corresponding to the command. Therefore, the input portion identifies the hand motion with the association result, and executes the input to the information processing apparatus depending on the identified hand motion, so that it is capable of executing the input to the information processing apparatus with high accuracy. As a result, it is capable of executing the input to the information processing apparatus with high accuracy, without executing such a complicated operation as to set the plurality of myoelectric sensors on preset positions accurately.

Preferably, the setting portion extracts time-series characteristic master data from the myoelectric signals detected by the plurality of myoelectric sensors, and associates the extracted time-series characteristic master data with the particular motion, and the input portion extracts time-series characteristic data from myoelectric signals detected by the plurality of myoelectric sensors based on the hand motion of the person after the termination of the association by the setting portion, and identifies the hand motion from the extracted characteristic data and the association result. In this case, an integrated value average voltage (IEMG), an average frequency (MPF), a center frequency, a root-mean-square value (RMS), a standard deviation of frequency distribution (SDFD), a frequency spectrum, or the like can be used as the characteristic master data and the characteristic data.

Preferably, the input system further includes a main body portion that maintains the plurality of myoelectric sensors at preset positions, and is shaped or is substantially shaped in a form of annulus. In this case, there is an advantage that the person is liberated from botheration to wear the plurality of myoelectric sensors on the hand or the like one by one.

More preferably, the main body portion is provided with an output portion outputting the command from the setting portion. Since the main body portion is positioned in the vicinity of the hand, the person becomes easy to understand the command from the setting portion, and hence the operability of the input system can be improved.

Preferably, the command from the setting portion may include a command recognized through the sight of the person or a command recognized through the hearing of the person. These commands may be used at the same time.

Preferably, the input from the input portion to the information processing apparatus is executed by wireless communication. Wiring for connecting between a part worn on the person and the information processing apparatus can be eliminated. As a result, the operability of the input system can be improved.

According to a second aspect of the present invention, there is provided an input apparatus executing an input to an information processing apparatus depending on the hand motion of a person, including a main body portion that is shaped or is substantially shaped in the form of annulus and is worn so as to surround the palm and the back of a hand of the person in a state where the hand of the person from a second finger to a fifth finger is inserted into the main body portion; and a plurality of myoelectric sensors that are provided on the main body portion, and detect myoelectric signals depending on the hand motion of the person.

With the above arrangement, the main body portion, which is shaped or substantially shaped in the form of annulus and has the plurality of myoelectric sensors, is worn so as to surround the palm and the back of the hand of the person in the state where the hand of the person from the second finger to the fifth finger is inserted into the main body portion. As a result, the finger motion is not limited as in the case where the main body portion is worn on the finger, and difficulty of the wearing and the possibility of the falling off can be also reduced.

Preferably, the plurality of myoelectric sensors are disposed in at least palm side of the hand. In this case, muscular discharge (an electric potential detected when each muscle shrinks) of each muscle on the palm side of the hand, which shrinks when each finger bends, can be detected. As a result, bending of each finger can be detected in an appropriate timing.

BRIEF DESCRIPTION OF THE DRAWINGS

Preferred embodiments of the present invention will be described in detail with reference to the following drawings, wherein:

FIG. 8A is a diagram showing a correspondence relationship between pointer moving patterns and pointer motion messages;

FIG. 8B is a diagram showing a correspondence relationship between pointer moving patterns and pieces of characteristic master data;

DESCRIPTION OF THE PREFERRED EMBODIMENTS

An embodiment of the present invention will be circumstantially described below based on FIGS. 1 to 9.

Figure 1:
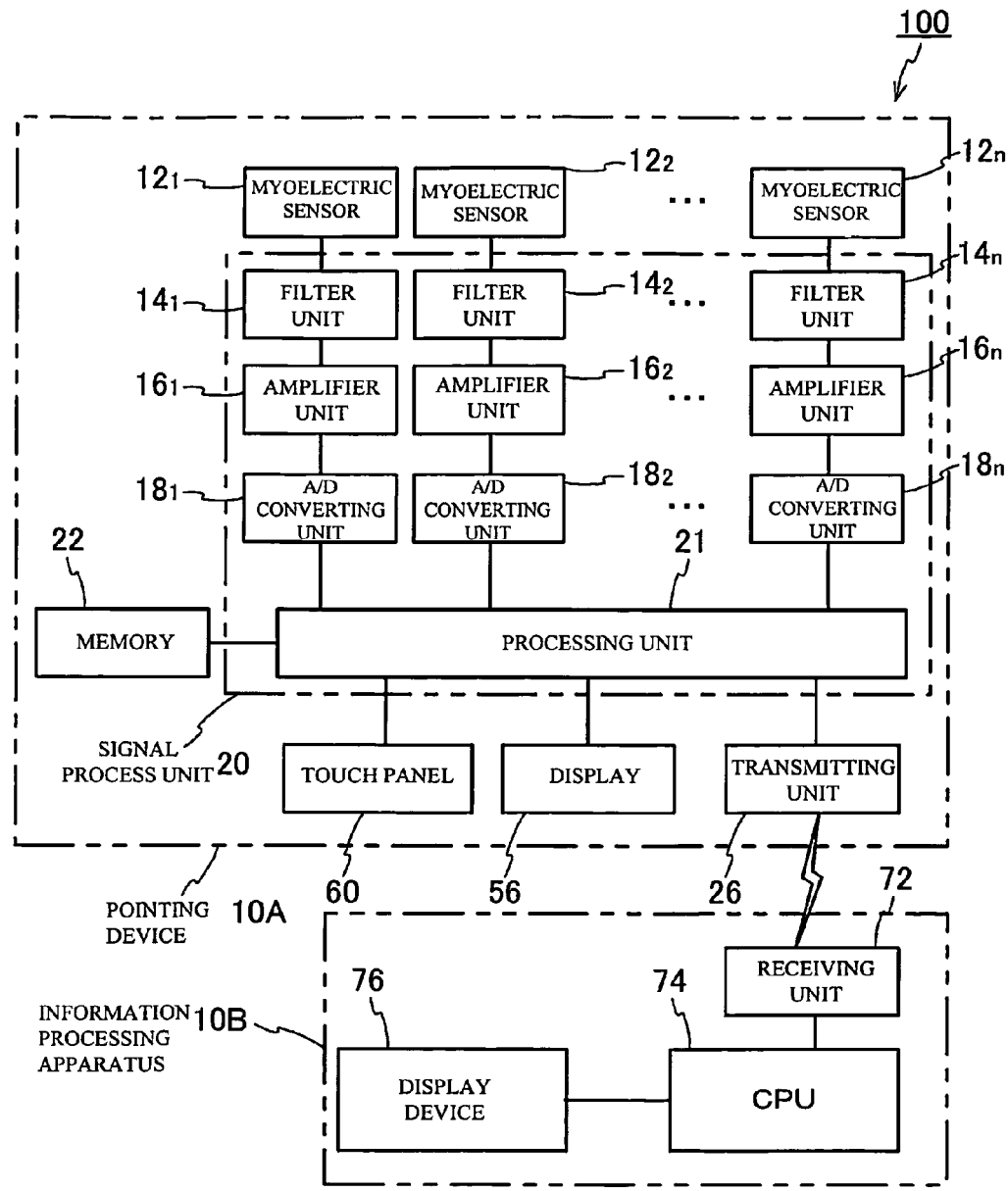
FIG. 1 is a block diagram showing the construction of an information processing system according to an embodiment of the present invention.

As shown in a block diagram of FIG. 1, a information processing system 100 according to the embodiment of the present invention is provided with a pointing device 10A which is worn by an operator (a user), and an information processing apparatus 10B which receives the results of a process executed by the pointing device 10A (i.e., the results of the output from the pointing device 10A), and moves a pointer displayed on a display device 76 depending on the results of the process.

Figure 2:
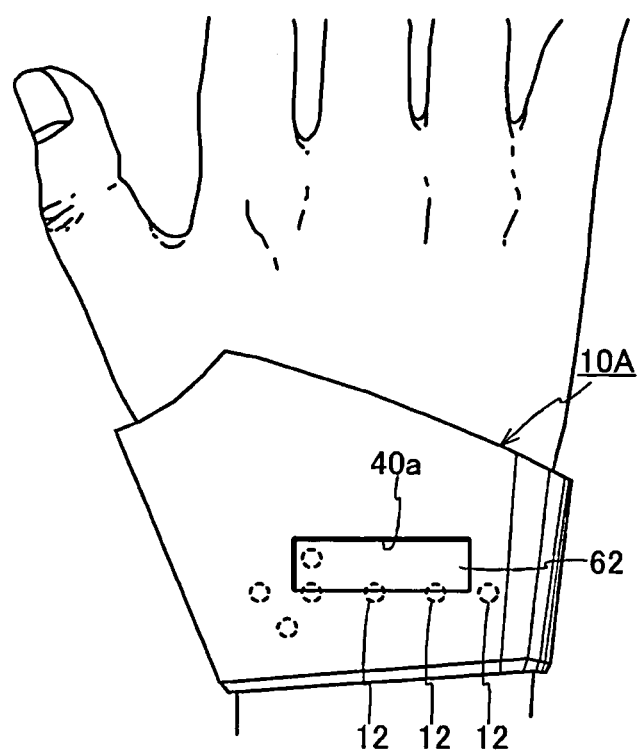
FIG. 2 is a diagram showing a state where a pointing device is worn on a wrist.

Actually, the pointing device 10A is worn on a part of a wrist of the operator as shown in FIG. 2.

Figure 3:
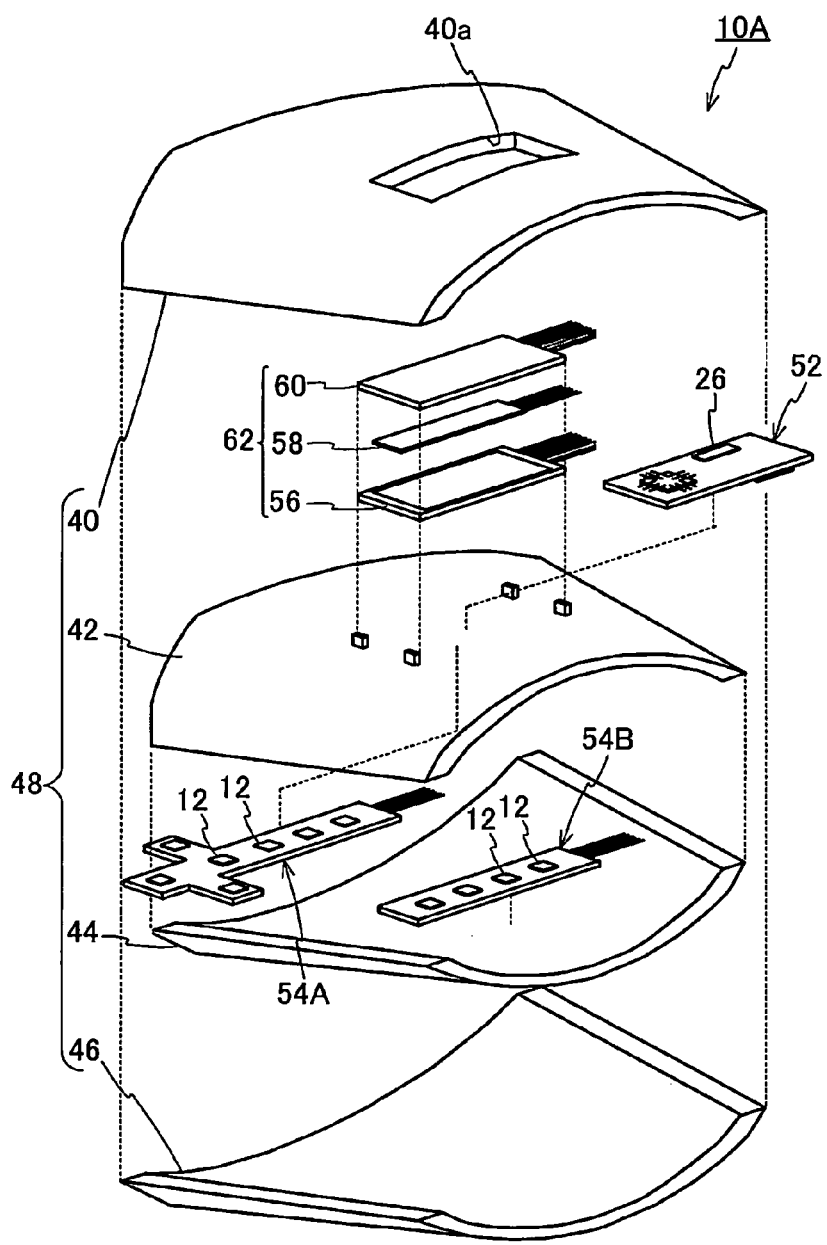
FIG. 3 is an exploded perspective view of the pointing device.

The pointing device 10A is provided with a main body unit 48, a main substrate 52, first and second flexible substrates 54A and 54B each having plural myoelectric sensors 12, and a display unit 62 including a display 56, a transparent solar battery 58, and a touch panel 60, as shown in an exploded perspective view of FIG. 3.

The main body unit 48 includes a first top case 40 where a rectangular window 40a is formed in a center part thereof; a first bottom case 46 having a shape which is in a substantially vertically symmetrical relationship with the first top case 40, and being substantially shaped in a form of annulus by coupling with the first top case 40; a second top case 42 which is provided inside the first top case 40 (i.e., at a bottom side of the first top case 40), and is one size smaller than the first top case 40; and a second bottom case 44 having a shape which is in a substantially vertically symmetrical relationship with the second top case 42, and being substantially shaped in a form of annulus by coupling with the second top case 42. The operator wears the pointing device 10A on the wrist inserted in a space between the second top case 42 and the second bottom case 44 of the main body unit 48. Material having a property of being transformable somewhat, e.g. resin, rubber, or the like, can be adopted as the material of the main body unit 48 to permit the motion of the hand and the wrist. An adjusting mechanism (an adjuster), not shown, for coupling the first top case 40 with the first bottom case 46 and making the main body unit 48 fit the wrist of the operator is provided between the first top case 40 and the first bottom case 46.

The main substrate 52 includes a signal process unit 20 (not shown in FIG. 3; see FIG. 1), a transmitting unit 26, a memory 22 (not shown in FIG. 3; see FIG. 1), a button battery (not shown), and the like, and is provided between the first top case 40 and the second top case 42. A concrete content of the function of each element included in the main substrate 52 will be described later.

On the first and second flexible substrates 54A and 54B, the plural myoelectric sensors 12 (i.e., n myoelectric sensors) are provided at predetermined intervals. In FIG. 1, the plural myoelectric sensors 12 to which subscripts such as "$12_1$, $12_2$ ... $12_n$," are added are shown for convenience of explanation. The plural myoelectric sensors $12_1$ to $12_n$ detect the myoelectric signals generated by the muscles depending on the motion of the wrist, or the like. Each myoelectric signal changes by the activity of muscular cells, and the amplitude of the change changes in proportion to the size of the muscle activity.

Figure 4:
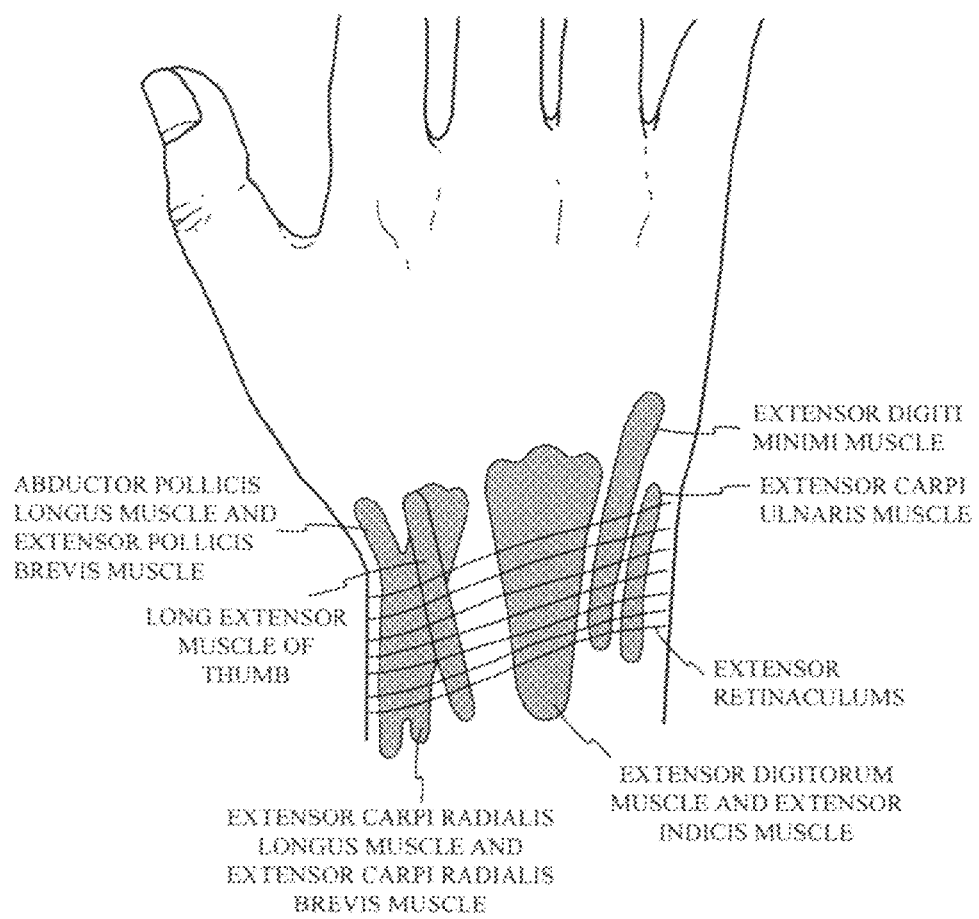
FIG. 4 is a diagram showing muscles in the vicinity of the wrist.

The first flexible substrate 54A is provided inside the second top case 42 (i.e., at a bottom surface of the second top case 42), and the second flexible substrate 54B is provided inside the second bottom case 44 (i.e., at an upper surface of the second bottom case 44). Each of the myoelectric sensors 12 touches the skin in the vicinity of the wrist of the operator. That is, in the embodiment of the present invention, the pointing device 10A is worn on the part of the wrist of the operator as shown in FIG. 2, and the myoelectric sensors $12_1$ to $12_n$ can be arranged near the muscles (i.e., an abductor pollicis longus muscle and an extensor pollicis brevis muscle, an extensor carpi radialis longus muscle and an extensor carpi radialis brevis muscle, a long extensor muscle of thumb, an extensor digitorum muscle and an extensor indicis muscle, an extensor retinaculums, an extensor carpi ulnaris muscle, an extensor digiti minimi muscle, and the like) which are positioned in the vicinity of the wrist and relate to the finger motion, as shown in FIG. 4. Thus, it is possible to effectively obtain the myoelectric signals of the muscles relating to the finger motion.

Referring to FIG. 3, the display 56 constituting the display unit 62 is composed of an electronic paper, an organic light emitting display, or a liquid crystal display, for example. The transparent solar battery 58 obtains the electric power used for operating the display 56, the touch panel 60, and the like. The touch panel 60 is an input interface for the operator to touch a character, a figure, and so on displayed on the display 56, and to enable the operation of the pointing device 10A. The display unit 62 constituted as above is provided outside the second top case 42 (i.e., at the upper side of the second top case 42) and is in a condition to have been fit in the rectangular window 40a formed on the first top case 40.

Next, the above-mentioned signal process unit 20 will be described below based on FIG. 1. The signal process unit 20 includes filter units $14_1$ to $14_n$ corresponding to the n myoelectric sensors ($12_1$ to $12_n$), respectively, amplifier units $16_1$ to $16_n$ that amplify the myoelectric signals via the filter units $14_1$ to $14_n$, A/D converting units $18_1$ to $18_n$ that convert the myoelectric signals (analog signals) via the amplifier units $16_1$ to $16_n$ into digital signals, a processing unit 21 as a setting portion and an input portion of the present invention that processes the output from the A/D converting units $18_1$ to $18_n$.

The filter units $14_1$ to $14_n$ are composed of band pass filers having passbands of several tens Hz to 1.5 kHz, for example, and eliminates a polarization voltage of the electrode, a noise of a power supply, a high frequency noise, and the like. The amplifier units $16_1$ to $16_n$ amplify the myoelectric signals (ordinarily, about several tens mV) output from the filter units $14_1$ to $14_n$ to a level in which signal analysis can be executed. The processing unit 21 processes the digital signals output from the A/D converting units $18_1$ to $18_n$. The memory 22 that stores data used for the process of the digital signals, the display 56 and the touch panel 60 that constitute the display unit 62, and the transmitting unit 26 that transmits the results of the process to a receiving unit 72 in the information processing apparatus 10B are connected to the processing unit 21. Wireless communication using, for example, an electric wave, infrared rays, or the like is executed between the transmitting unit 26 and the receiving unit 72.

The information processing apparatus 10B in FIG. 1 is provided with a CPU 74, the receiving unit 72 that is connected to the CPU 74, and a display device 76 that is composed of a liquid crystal display, a CRT display, a projection system including a projector and a screen, or the like. The CPU 74 moves the pointer displayed on the display device 76 based on the results of the process of the pointing device 10A received by the receiving unit 72.

Next, an input process to the information processing apparatus 10B with the pointing device 10A according to the embodiment of the present invention will be described below based on FIGS. 5 to 9.

As a precondition for the input process, a power supply of the information processing apparatus 10B is turned on in advance, and the operator wears the pointing device 10A in the vicinity of the wrist as shown in FIG. 2. In this case, the operator may fit the pointing device 10A to the shape of the wrist to position it at a suitable position, and fix the pointing device 10A on the wrist with the adjusting mechanism (the adjuster), not shown. The following process is mainly executed by the processing unit 21 in the pointing device 10A, and the description of the subject of the process therefore is omitted except a necessary case.

Figure 5:
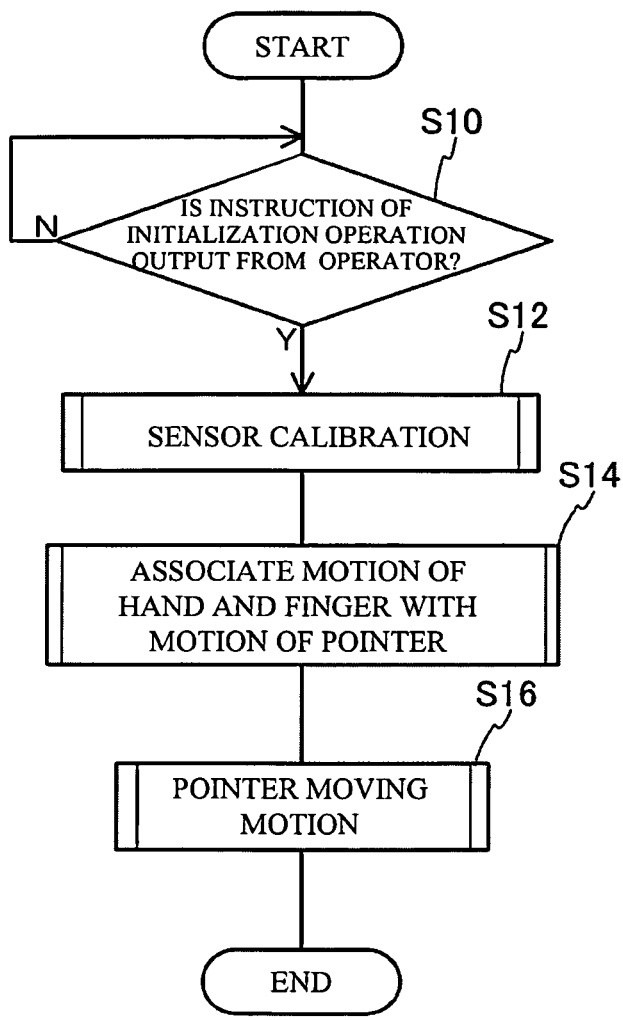
FIG. 5 is a flowchart showing a process of the pointing device according to the embodiment of the present invention.

First, in step S10 of FIG. 5, the processing unit 21 waits until an instruction of initialization operation is output from the operator via the touch panel 60 provided on the pointing device 10A. When the instruction of initialization operation is output from the operator via the touch panel 60, the procedure exceeds to next step S12.

In step S12, the processing unit 21 executes a subroutine of a sensor calibration. The subroutine of the sensor calibration is executed to obtain output signals of all the myoelectric sensors $12_1$ to $12_n$ in a state where the hand and the finger are maintained in a certain constant posture.

Specifically, the following process is executed.

Figure 6:
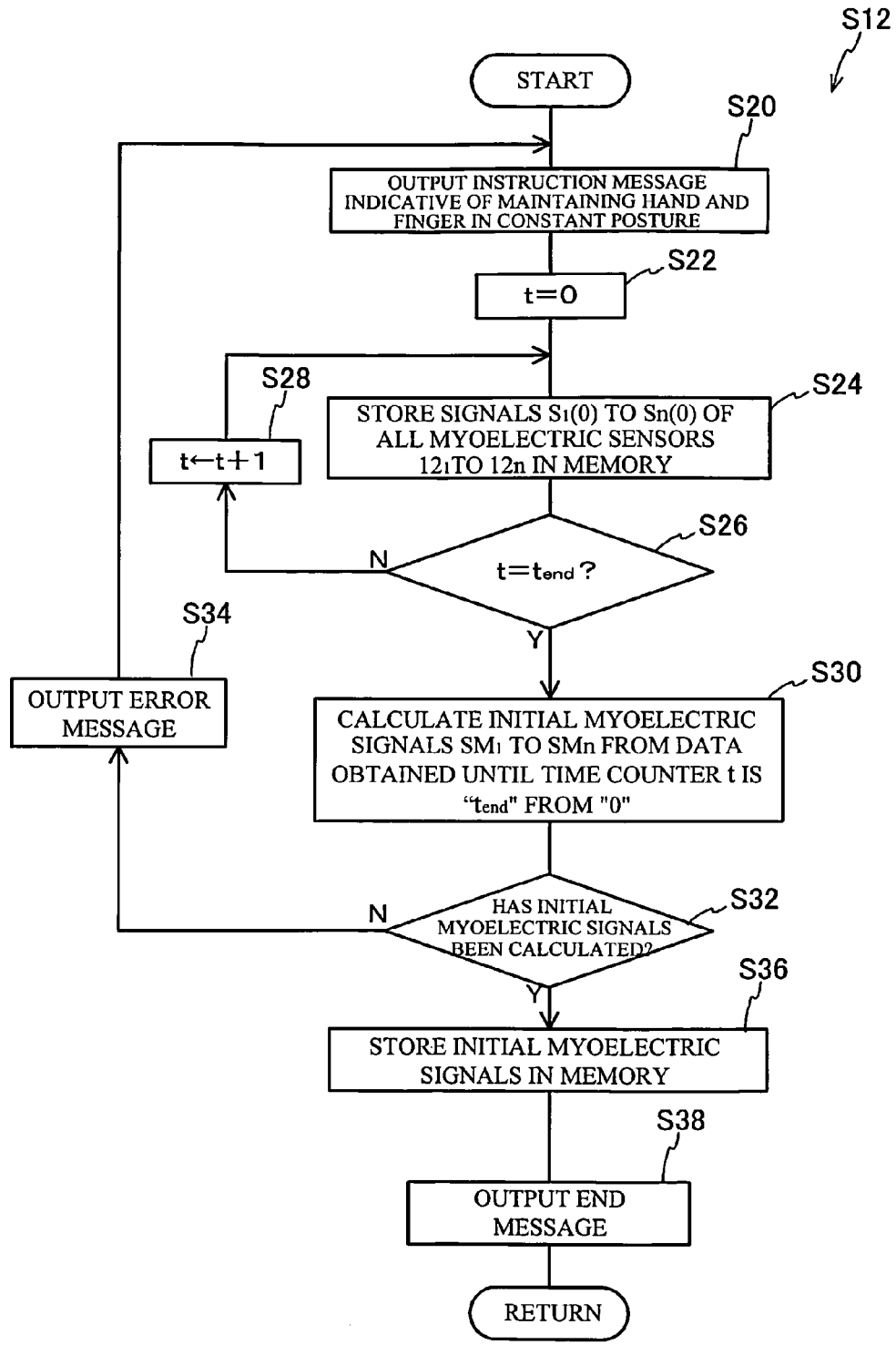
FIG. 6 is a flowchart showing the details of a procedure in step S12 of FIG. 5.

First, as shown in step S20 of FIG. 6, the processing unit 21 outputs an instruction message indicative of maintaining the hand and the finger in the constant posture to the display 56 on the pointing device 10A. Next, in step S22, the processing unit 21 sets a counter t representing time to "0". In step S24, the processing unit 21 obtains detection signals $S_1(0)$ to $S_n(0)$ of all the myoelectric sensors $12_1$ to $12_n$ (i.e., digital signals generated via the filter units, the amplifier units, and A/D converting units), and stores the detection signals $S_1(0)$ to $S_n(0)$ in the memory 22.

In next step S26, the processing unit 21 determines whether the counter t is $t_{end}$ (the $t_{end}$ represents end time of the subroutine of the sensor calibration). Here, since the counter t is "0", the answer to the determination of step S26 is "NO", and the procedure exceeds to step S28. In step S28, the counter t is incremented by 1 (t←t+1), and in step S24, the processing unit 21 then obtains detection signals $S_1(1)$ to $S_n(1)$ of all the myoelectric sensors $12_1$ to $12_n$ (i.e., digital signals generated via the filter units, the amplifier units, and A/D converting units), and stores the detection signals $S_1(1)$ to $S_n(1)$ in the memory 22. Then, the procedures of step S24, step S26, and step S28 are repeated until the counter t is $t_{end}$, so that the detection signals $S_1(0)$ to $S_1(t_{end})$, $S_2(0)$ to $S_2(t_{end})$, . . . , and $S_n(0)$ to $S_n(t_{end})$ are stored in the memory 22.]

In next step S30, the processing unit 21 calculates initial myoelectric signals $SM_1$ to $SM_n$ from the detection signals (data) obtained by the above-mentioned procedures. Here, a mean value of the detection signals $S_1(0)$ to $S_1(t_{end})$ can be adopted as the initial myoelectric signal $SM_1$, for example. In this case, the initial myoelectric signal $SM_1$ is calculated according to the following equation (1):

$$SM_1 = \frac{1}{t_{end}} \sum_{t=0}^{t_{end}} S_1(t) \tag{1}$$

The other initial myoelectric signals $SM_2$ to $SM_n$ can be also calculated in a manner as described above.

It should be noted that a decision method of the initial myoelectric signal is not limited to this. Detection signals $S_1(t_k)$, $S_2(t_k)$, . . . , and $S_n(t_k)$ with regard to arbitrary time $t_k$ may be set to the initial myoelectric signals $SM_1$ to $SM_n$, respectively. Moreover, the calculation results obtained by other operations may be set to the initial myoelectric signals $SM_1$ to $SM_n$.

Next, in step S32, the processing unit 21 determines whether the initial myoelectric signals $SM_1$ to $SM_n$ have been calculated. Specifically, the processing unit 21 determines whether a signal greatly different from other initial myoelectric signals exists in the initial myoelectric signals calculated in step S30. In the determination of step S32, in the case where the signal greatly different from other initial myoelectric signals exists (i.e., in the case where the operator do not maintain the hand in the constant posture, and right initial myoelectric signals are not obtained) is regarded as in the case where the initial myoelectric signals are not calculated. When the answer to the determination of step S32 is "NO" (i.e., when the initial myoelectric signals are not calculated), the processing unit 21 outputs (displays) an error message to the display 56 in step S34 to execute the procedures of steps S20 to S30 again. The procedure exceeds to step S20, and the processing unit 21 outputs the instruction message indicative of maintaining the hand and the finger in the constant posture to the display 56 again. Then, the procedures of steps S20 to S34 are repeated until the answer to the determination of step S32 is "YES".

Then, when the answer to the determination of step S32 is "YES", the processing unit 21 stores the initial myoelectric signals $SM_1$ to $SM_n$ calculated in step S30 in the memory 22, in step S36. In step S38, the processing unit 21 outputs (displays) to the display 56 an end message to tell the end of the subroutine of the sensor calibration to the operator, and terminates the subroutine of the sensor calibration in FIG. 6. The procedure exceeds to step S14 of FIG. 5.

Next, in step S14 of FIG. 5, the processing unit 21 associates the motion of the hand and the finger with the motion of the pointer (hereinafter referred to as "the association subroutine").

Figure 7:
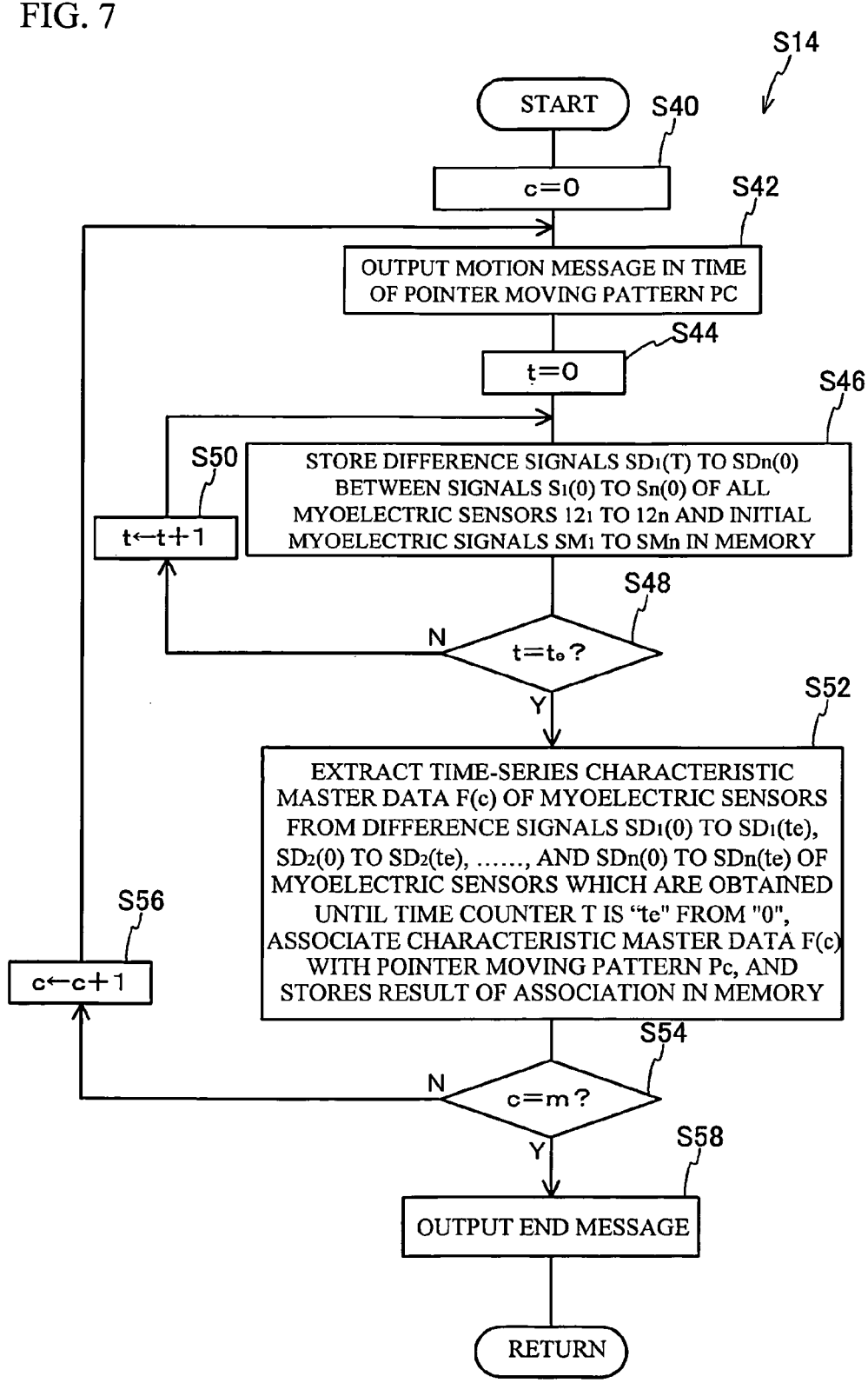
FIG. 7 is a flowchart showing the details of a procedure in step S14 of FIG. 5.
Figure 9:
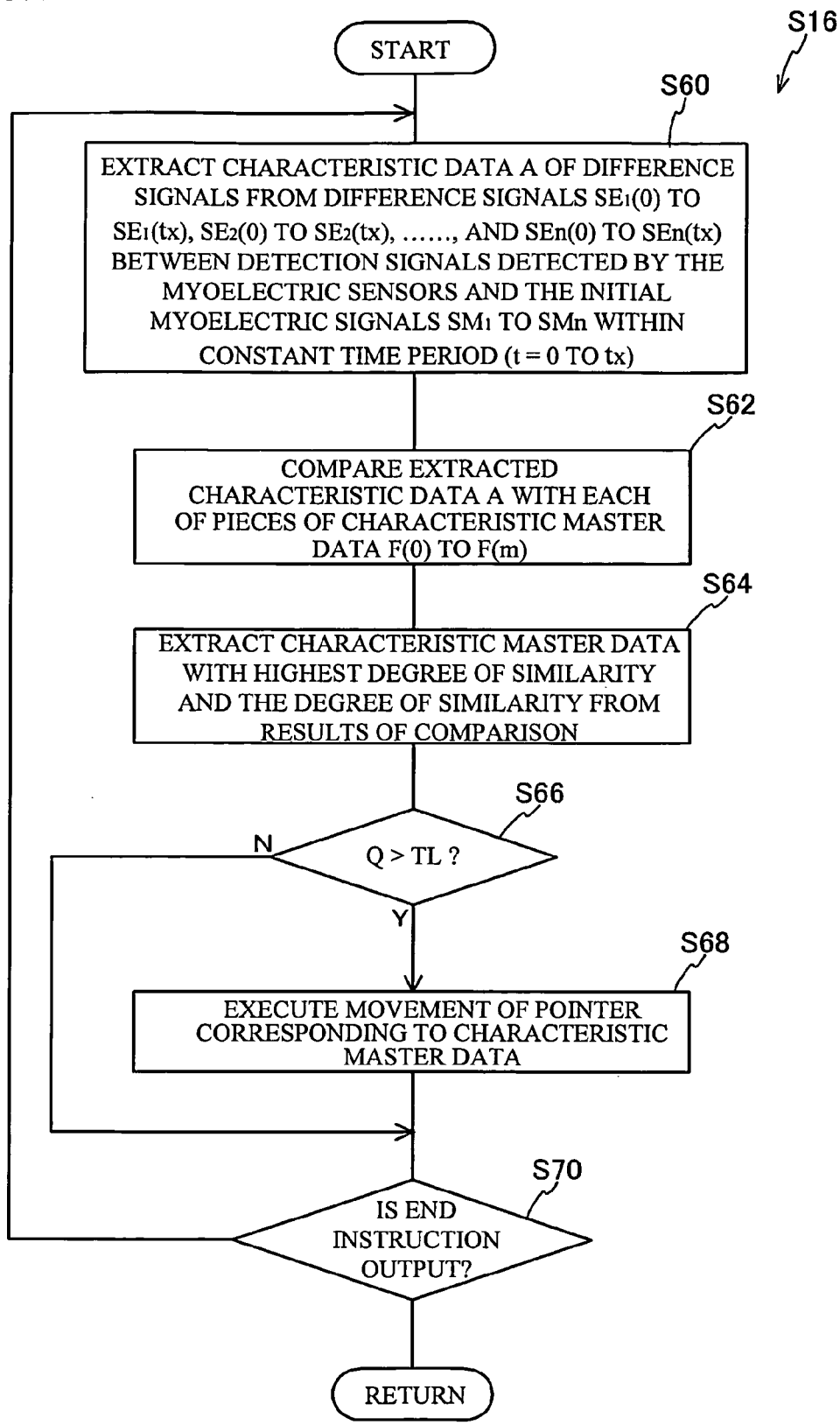
FIG. 9 is a flowchart showing the details of a procedure in step S16 of FIG. 5.

In the association subroutine, the processing unit 21 first sets a counter c of a pointer moving pattern to "0" in step S40 of FIG. 7. Next, in step S42, the processing unit 21 displays a motion message when the pointer moving pattern $P_c$ is "$P_0$". In this case, a pointer motion message is set as shown in a table of FIG. 8A. Here, the processing unit 21 therefore outputs (displays) the motion message indicative of moving a second finger (i.e., an index finger) rightward and leftward to the display 56 on the pointing device 10A.

In next step S44, the processing unit 21 sets a time counter t to "0". In next step S46, the processing unit 21 obtains detection signals $S_1(0)$ to $S_n(0)$ of all the myoelectric sensors $12_1$ to $12_n$ in a state where the operator moves the second finger (i.e., the index finger) rightward and leftward, and reads the initial myoelectric signals $SM_1$ to $SM_n$ obtained by the subroutine of the sensor calibration (step S12) from the memory 22. Then, the processing unit 21 calculates difference signals ($SD_1(0)$ to $SD_n(0)$) according to the following equation (2), and stores the difference signals in the memory 22:

$$SD_1(0) = S_1(0) - SM_1$$
$$SD_2(0) = S_2(0) - SM_2$$
$$\vdots$$
$$SD_n(0) = S_n(0) - SM_n$$

(2)

Next, in step S48, the processing unit 21 determines whether the time counter t is $t_e$ (the $t_e$ represents end time of the association subroutine). Here, since the time counter t is "0", the answer to the determination of step S48 is "NO", and the procedure exceeds to step S50. In step S50, the time counter t is incremented by 1 (t←t+1), and in step S46, the processing unit 21 then obtains detection signals $S_1(1)$ to $S_n(1)$ of all the myoelectric sensors $12_1$ to $12_n$, calculates difference signals $SD_1(1)$ to $SD_n(1)$ indicative of the differences between the detection signals $S_1(1)$ to $S_n(1)$ and the initial myoelectric signals $SM_1$ to $SM_n$ in the same manner as the above-mentioned equation (2), and stores the difference signals $SD_1(1)$ to $SD_n(1)$ in the memory 22. Then, the procedures of step S46, step S48, and step S50 are repeated until the time counter t is $t_e$, so that the difference signals $SD_1(0)$ to $SD_1(t_e)$, $SD_2(0)$ to $SD_2(t_e)$, . . . , and $SD_n(0)$ to $SD_n(t_e)$ are stored in the memory 22.

Next, in step S52, the processing unit 21 extracts time-series characteristic master data F(c) of the myoelectric sensors $12_1$ to $12_n$ from the difference signals $SD_1(0)$ to $SD_1(t_e)$, $SD_2(0)$ to $SD_2(t_e)$, . . . , and $SD_n(0)$ to $SD_n(t_e)$ of the myoelectric sensors $12_1$ to $12_n$ which are obtained until the time counter t is "$t_e$" from "0", associates characteristic master data F(c) (here, c=0) with the pointer moving pattern $P_0$, and stores the result of the association in the memory 22. In this case, an integrated value average voltage (IEMG), an average frequency (MPF), a center frequency, a root-mean-square value (RMS), a standard deviation of frequency distribution (SDFD), a frequency spectrum, or the like can be used as the characteristic master data.

In next step S54, the processing unit 21 determines whether the counter c is "m" ("m" shows the number of all pointer moving patterns). Here, since the counter c is "0", the answer to the determination of step S54 is "NO", and the procedure exceeds to step S56. In step S56, the counter c is incremented by 1 (c←c+1), and then the procedure returns to step S42. Then, the procedures of step S42 to step S56 are repeated in a manner as described above, so that the processing unit 21 associates pieces of characteristic master data F(c) and all the pointer moving patterns $P_c$ with each other. FIG. 8B shows a table indicative of a state where all the pointer moving patterns $P_c$ and the pieces of characteristic master data F(c) are associated with each other.

Then, the association between all the pointer moving patterns $P_c$ and the pieces of characteristic master data F(c) is terminated. When the answer to the determination of step S54 is "YES", the procedure exceeds to step S58. In step S58, the processing unit 21 outputs (displays) an end message to the display 56, and terminates the association subroutine in FIG. 7. Then, the procedure returns to step S16 of FIG. 5.

In step S16 of FIG. 5 (i.e., a subroutine of a pointer moving motion), the motion of the operator is identified by using data stored in the memory 22 in steps S12 and S14, the movement of the pointer corresponding to the motion of the operator is executed.

In the subroutine of the pointer moving motion, the processing unit 21 first extracts characteristic data A of the difference signals from the difference signals $SE_1(0)$ to $SE_1(t_x)$, $SE_2(0)$ to $SE_2(t_x)$, . . . , and $SE_n(0)$ to $SE_n(t_x)$ between the detection signals detected by the myoelectric sensors $12_1$ to $12_n$ and the initial myoelectric signals $SM_1$ to $SM_n$ within a constant time period (t=0 to $t_x$) in step S60 of FIG. 6. This procedure is similar to the above-mentioned procedures of steps S46 and S52 of FIG. 7. In this case, it is required that the characteristic data A is the same type as the characteristic master data F(c) extracted in the above-mentioned procedure of step S52.

In next step S62, the processing unit 21 compares the extracted characteristic data A with each of the pieces of characteristic master data F(0) to F(m). Then, in next step S64, the processing unit 21 extracts characteristic master data with the highest degree of similarity (i.e., any one of F(0) to F(m)) and the degree of similarity Q from the results of the comparison in step S62.

Further, in step S66, the processing unit 21 determines whether the degree of similarity Q is larger than a preset threshold value TL (i.e., a threshold level). In this case, if the degree of similarity Q is larger than the preset threshold value TL, this means that the motion of the operator is identical with the pointer moving pattern $P_c$ corresponding to the characteristic master data with the highest degree of similarity. Therefore, when the answer to the determination of step S66 is "YES" (i.e., Q>TL), the procedure exceeds to step S68. In step S68, the processing unit 21 selects the pointer moving pattern corresponding to the characteristic master data with the highest degree of similarity, and outputs the selected pointer moving pattern as output information to the CPU 74 via the transmitting unit 26 and the receiving unit 72. The CPU 74 controls the pointer according to the output information from the processing unit 21 so that the pointer displayed on the display device 76 is moved according to the pointer moving pattern.

Then, in step S70, the procedures of steps S60 to S68 are repeated until an end instruction is output by the operator via the touch panel 60. When the answer to the determination of step S70 is "YES", the sequence of the procedures is terminated.

In the above-mentioned subroutine of the pointer moving motion, the operators only moves the hand and the finger, so that the pointer moves according to it. Therefore, when the operators does not want to move the pointer, it is possible to install a mode which can stop the movement of the pointer in the pointing device 10A without removing the pointing device 10A from the wrist. By installing such a mode in the pointing device 10A, when a suspension button is displayed on the display 56 for example, and the operators does not want to move the pointer, it is possible to temporarily stop the procedure of step S16 (i.e., the subroutine of the pointer moving motion) by depressing the suspension button via the touch panel 60.

In the above-mentioned embodiment of the present invention, the difference signals between the actual detection signals of the myoelectric sensors and the initial myoelectric signals are used as the output of the myoelectric sensors $12_1$ to $12_n$ (steps S46 and S60). However, the present invention is not limited to this. For example, a difference signal between a detection signal of each of the myoelectric sensors and a detection signal of a particular myoelectric sensor (hereinafter referred to as "myoelectric sensor $12_b$") among the myoelectric sensors $12_1$ to $12_n$ can be used as the output. In this case, for example, a myoelectric sensor, in which few myoelectric signals are detected for a long time period, among the myoelectric sensors $12_1$ to $12_n$ can be adopted as the myoelectric sensor $12_b$. Specifically, in a design stage of the pointing device 10A, a myoelectric sensor is installed at a position where a myoelectric signal is not detected in the pointing device 10A, and the myoelectric sensor can be set to the myoelectric sensor $12_b$.

By obtaining the difference signal for which the detection signal of such particular myoelectric sensor $12_b$ is used, even when there is a change of environment during the use of the pointing device 10A, a highly accurate detection result that is not affected by the change of environment can be obtained. Further, by inputting the detection result to the information processing apparatus 10B, highly accurate input (e.g., the movement of the pointer) can be realized. The particular myoelectric sensor is not limited to a single sensor, but may be configured to be comprised of two or more sensors. In this case, a difference signal between a detection signal of the myoelectric sensor and an average of detection signals of the two or more particular myoelectric sensors may be used as the output. Moreover, other operation process is executed to the detection signals of the two or more particular myoelectric sensors, and a difference signal between the detection signal of the myoelectric sensor and the operation result may be used as the output.

As described above in detail, according to the embodiment of the present invention, the processing unit 21 displays on the display 56 the motion message to let the operator execute a particular motion for which the hand is used (i.e., a motion according to the pointer moving pattern $P_c$), associates detection results of the myoelectric sensors $12_1$ to $12_n$ when the operator executes the motion according to the motion message with the particular motion (i.e., the motion according to the pointer moving pattern $P_c$), identifies a motion executed by the operator with the association result and the detection results of the myoelectric sensors $12_1$ to $12_n$ based on the hand motion of the operator after the termination of the association, and execute an input (such as the movement of the pointer) depending on the identified motion to the information processing apparatus 10B. Therefore, it is capable of executing the input (such as the movement of the pointer) to the information processing apparatus with high accuracy, without executing such a complicated operation as to set the plural myoelectric sensors $12_1$ to $12_n$ on preset positions accurately.

In the embodiment of the present invention, since the annular main body unit 48 for maintaining the plural myoelectric sensors $12_1$ to $12_n$ at preset positions is provided, there is an advantage that the operator is liberated from botheration to wear the plural myoelectric sensors $12_1$ to $12_n$ on the hand or the like one by one.

In the embodiment of the present invention, since the main body unit 48 is provided with the display 56, the display 56 is positioned in the vicinity of the hand of the operator. Thus, the operator becomes easy to understand the message from the processing unit 21, and hence the operability of the pointing device 10A can be improved.

In the embodiment of the present invention, since input information is transmitted from the pointing device 10A to the information processing apparatus 10B by wireless communication, wiring to the pointing device 10A can be eliminated. As a result, the operability of the pointing device 10A can be improved.

Although in the embodiment of the present invention, the message is transmitted through the sight of the operator by displaying the message from the processing unit 21 on the display, the present invention is not limited to this. For example, the message may be transmitted through the hearing of the operator by sound. Further, the message may be transmitted through both of them.

Figure 10:
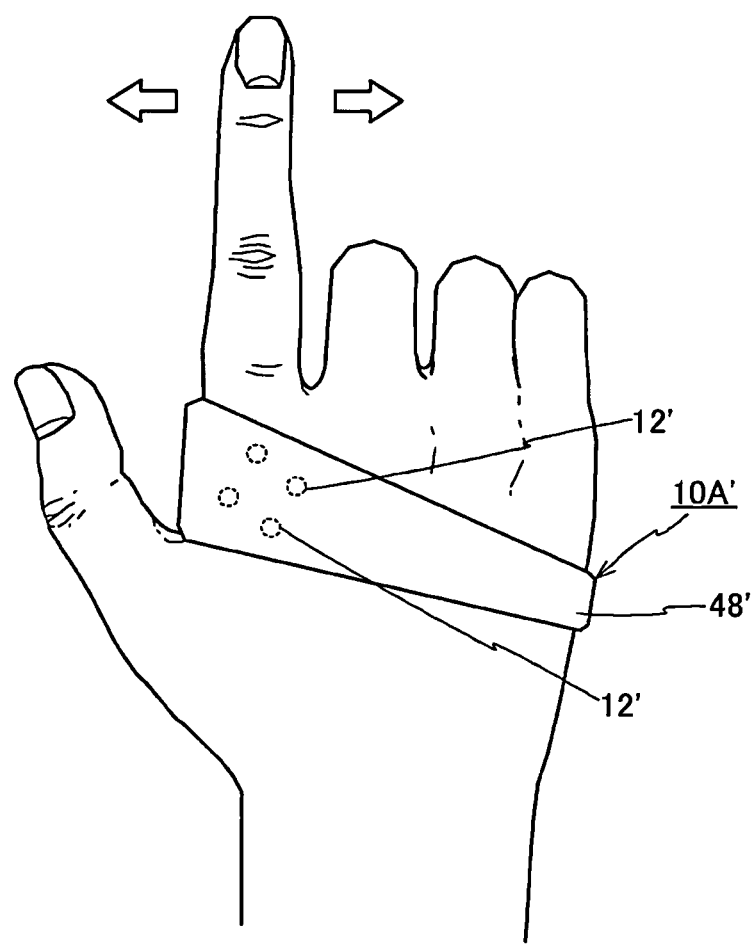
FIG. 10 is a diagram showing an example of wearing the pointing device according to a variation of the embodiment of the present invention.

Although in the embodiment of the present invention, the pointing device 10A is worn in the vicinity of the wrist of the operator, the present invention is not limited to this. For example, a pointing device 10A' as shown in FIG. 10 may be adopted. The pointing device 10A' is provided with a main body unit 48' which is shaped in the form of annulus and is worn so as to surround the palm and the back of the hand in a state where the hand of the operator from the 2nd finger (index finger) to a 5th finger (pinky finger) is inserted into the main body unit 48', plural myoelectric sensors 12' provided in an inner peripheral surface (a palm side of the hand) of the main body unit 48'.

Figure 11:
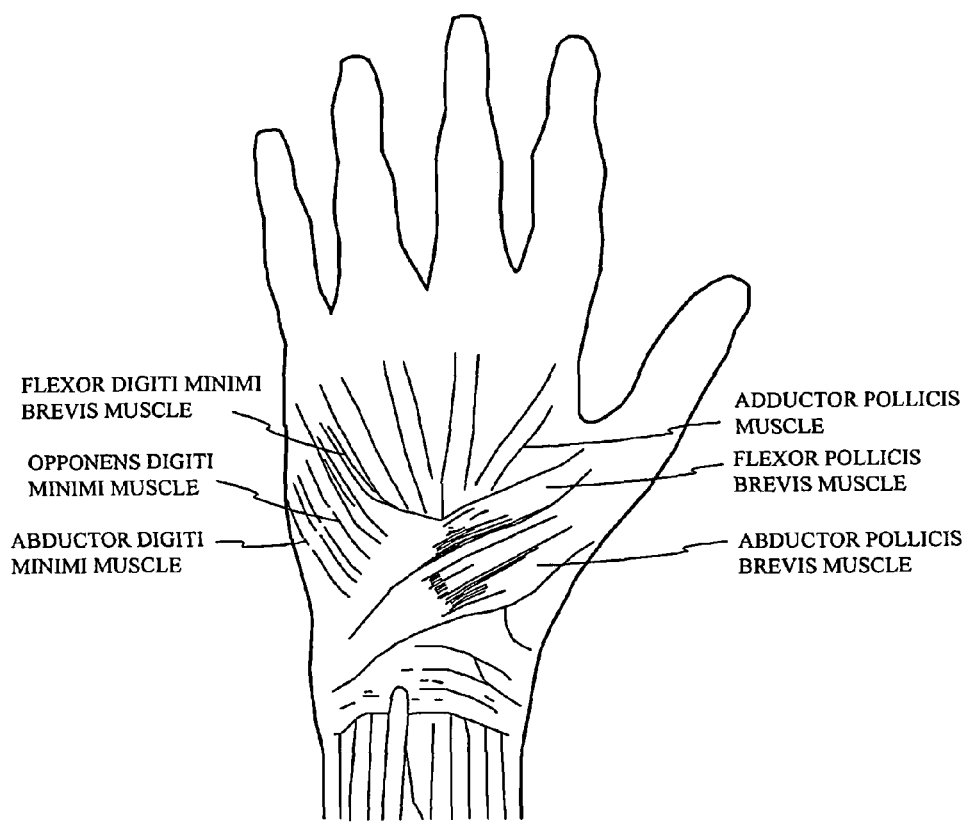
FIG. 11 is a diagram showing muscles in a palm side of the hand.

By adopting such pointing device 10A', the finger motion is not limited as in the case where the main body unit is worn on the finger, and difficulty of the wearing and the possibility of the falling off are also reduced. Moreover, as is apparent from FIG. 11 indicative of muscles on the palm side of the hand, myoelectric sensors 12' can be made to touch to the muscles on the palm side of the hand, such as a adductor pollicis muscle, a flexor pollicis brevis muscle, an opponens digiti minimi muscle, a flexor digiti minimi brevis muscle, and an abductor digiti minimi muscle, and muscular discharge (an electric potential detected when each muscle shrinks) of each muscle on the palm side of the hand, which shrinks when each finger bends, can be detected. As a result, bending of each finger can be detected in an appropriate timing. It should be noted that, similarly to the above described embodiment, the pointing device 10A' in FIG. 10 may also be provided with the display 56 or the like. Similarly to the above described embodiment, the pointing device 10A' may execute the subroutine of the sensor calibration, the association subroutine, and the like, and then execute the pointer moving motion with the results of the subroutines.

Although in the embodiment and the variation of the present invention, the main body unit 48 and the main body unit 48' are shaped in the form of annulus, the present invention is not limited to this. For example, each of the main body unit 48 and the main body unit 48' may be substantially shaped in the form of annulus having a cutout at a part thereof. In this case, the width of the cutout is variable by elastic force of the main body unit 48 or the main body unit 48', and it is therefore possible to finely adjust an inner diameter of the main body unit 48 or the main body unit 48' according to the size of the hand.

Although in the embodiment and the variation of the present invention, the movement of the pointer on the display device 76 is executed, the present invention is not limited to this. For example, given commands to the motions of the fingers and the hand are preset. When the operator executes any one of the motions of the fingers and the hand, the information processing apparatus 10B may execute given operation (e.g. resumu, suspend, power-off, or the like).

Further, the embodiment and the variation of the present invention is not limit to the movement of the pointer. For example, the finger motion is detected, so that the character a character corresponding to the finger motion may be input (keyboard input).

The present invention is not limited to the above embodiment. It should be understood that various changes and modifications may be made without departing from the spirit and scope of the present invention.

The present application is based on Japanese Patent Application No. 2007-152008 filed Jun. 7, 2007, the entire disclosure of which is hereby incorporated by reference.

What is claimed is:

1. An input system executing an input to an information processing apparatus depending on the hand motion of a person, comprising:
   a plurality of myoelectric sensors that are provided on a hand of the person in an area between a wrist of the person and bases of a second finger to a fifth finger, and output myoelectric signals depending on the hand motion;
   a setting portion that outputs at least one command to make the person execute at least one particular motion using the hand in a state where the plurality of myoelectric sensors are worn on the hand;
   one or more processors configured to:
      perform a sensor calibration subroutine of detecting and storing initial output myoelectric signals for each of the myoelectric sensors for a predetermined period of time in which the hand of the person is maintained in a constant posture; and
      when the setting portion outputs a command including a message that represents the input, the message indicating a motion to be made by the hand of the person, perform an associative subroutine of detecting output myoelectric signals for each of the myoelectric sensors for a predetermined period of time in which the motion is made by the hand of the person, calculate first difference signals indicative of a difference between the detected output myoelectric signals and the initial output myoelectric signals, extract time-series characteristic master data of the myoelectric sensors from the first difference signals, associate the time-series characteristic master data of the myoelectric sensors with the motion, and store a result of the association; and
   an input portion that identifies the hand motion from second difference signals calculated depending on the myoelectric signals output by the plurality of myoelectric sensors based on the hand motion of the person after termination of the associative subroutine, and executes the input to the information processing apparatus depending on the identified hand motion.

2. The input system as claimed in claim 1, further comprising a main body portion that maintains the plurality of myoelectric sensors at preset positions, and is shaped or is substantially shaped in a form of annulus.

3. The input system as claimed in claim 2, wherein the main body portion is provided with an output portion outputting the at least one command from the setting portion.

4. The input system as claimed in claim 1, wherein the at least one command from the setting portion includes a command recognized through the sight of the person.

5. The input system as claimed in claim 1, wherein the at least one command from the setting portion includes a command recognized through the hearing of the person.

6. The input system as claimed in claim 1, wherein the input from the input portion to the information processing apparatus is executed by wireless communication.

7. An input apparatus executing an input to an information processing apparatus depending on the hand motion of a person, comprising:
   a main body portion that is shaped or is substantially shaped in the form of annulus and is worn so as to surround the palm and the back of a hand of the person in a state where the hand of the person from a second finger to a fifth finger is inserted into the main body portion;
   a plurality of myoelectric sensors that are provided on the main body portion, and detect and output myoelectric signals depending on the hand motion of the person;
   a setting portion that outputs at least one command to make the person execute at least one particular motion using the hand in a state where the plurality of myoelectric sensors are worn on the hand;
   one or more processors configured to:
      perform a sensor calibration subroutine of detecting and storing initial output myoelectric signals for each of the myoelectric sensors for a predetermined period of time in which the hand of the person is maintained in a constant posture; and
      when the setting portion outputs a command including a message that represents the input, the message indicating a motion to be made by the hand of the person, perform an associative subroutine of detecting output myoelectric signals for each of the myoelectric sensors for a predetermined period of time in which the motion is made by the hand of the person, calculate first difference signals indicative of a difference between the detected output myoelectric signals and the initial output myoelectric signals, extract time-series characteristic master data of the myoelectric sensors from the first difference signals, associate the time-series characteristic master data of the myoelectric sensors with the motion, and store a result of the association; and an input portion that identifies the hand motion from second difference signals calculated depending on the myoelectric signals output by the plurality of myoelectric sensors based on the hand motion of the person after termination of the associative subroutine, and executes the input to the information processing apparatus depending on the identified hand motion.

8. The input apparatus as claimed in claim 7, wherein the plurality of myoelectric sensors are disposed in at least palm side of the hand.

9. The input system as claimed in claim 1, wherein
the setting portion outputs the at least one command only when it is determined that the hand and each of the fingers are in the constant posture.

10. The input system as claimed in claim 9, wherein
the input portion executes the input to the information processing apparatus depending on the identified hand motion only when a comparison between the first difference signals and the second difference signals is within a predetermined threshold.

11. The input apparatus as claimed in claim 7, wherein
the setting portion outputs the at least one command only when it is determined that the hand and each of the fingers are in the constant posture.

* * * * *

UNITED STATES PATENT AND TRADEMARK OFFICE
CERTIFICATE OF CORRECTION

| | |
|---|---|
| PATENT NO. | : 8,704,757 B2 |
| APPLICATION NO. | : 12/155661 |
| DATED | : April 22, 2014 |
| INVENTOR(S) | : Kurashima et al. |

Page 1 of 1

It is certified that error appears in the above-identified patent and that said Letters Patent is hereby corrected as shown below:

On the Title Page Item [56] (References Cited), insert
-- OTHER PUBLICATIONS Office Action issued by the Japanese Patent Office on January 31, 2012 in the corresponding Japanese patent application no. 2007-152008 --.

Signed and Sealed this
Twenty-second Day of July, 2014

Michelle K. Lee
*Deputy Director of the United States Patent and Trademark Office*